(12) United States Patent
Li (10) Patent No.: US 11,127,416 B2
(45) Date of Patent: Sep. 21, 2021

(54) METHOD AND APPARATUS FOR VOICE ACTIVITY DETECTION

(71) Applicant: BAIDU ONLINE NETWORK TECHNOLOGY (BEIJING) CO., LTD., Beijing (CN)

(72) Inventor: Chao Li, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 132 days.

(21) Appl. No.: 16/563,174

(22) Filed: Sep. 6, 2019

(65) Prior Publication Data

US 2019/0392859 A1    Dec. 26, 2019

(30) Foreign Application Priority Data

Dec. 5, 2018  (CN) .......................... 201811482222.6

(51) Int. Cl.
| | |
|---|---|
| *G10L 15/22* | (2006.01) |
| *G10L 25/84* | (2013.01) |
| *G10L 15/02* | (2006.01) |
| *G10L 15/05* | (2013.01) |
| *G10L 15/06* | (2013.01) |

(52) U.S. Cl.
CPC ............. *G10L 25/84* (2013.01); *G10L 15/02* (2013.01); *G10L 15/05* (2013.01); *G10L 15/063* (2013.01); *G10L 15/22* (2013.01)

(58) Field of Classification Search
CPC ... G10L 15/02; G10L 15/22; G10L 2015/088; G10L 25/87; G10L 15/16;

(Continued)

(56) References Cited

U.S. PATENT DOCUMENTS 6,023,674 A * 2/2000 Mekuria ................. G10L 25/78
704/207
6,097,820 A * 8/2000 Turner ................. G10L 21/0208
381/94.2

(Continued)

FOREIGN PATENT DOCUMENTS

| CN | 103095911 A | 5/2013 |
| CN | 105957520 A | 9/2016 |

(Continued)

OTHER PUBLICATIONS

First Office Action in CN Patent Application No. 201811482222.6 dated Jan. 5, 2021.

*Primary Examiner* — Vijay B Chawan
(74) *Attorney, Agent, or Firm* — Dilworth IP, LLC (57) ABSTRACT

A method and an apparatus for voice activity detection provided in embodiments of the present disclosure allow for dividing a to-be-detected audio file into frames to obtain a first sequence of audio frames, extracting an acoustic features of each audio frame in the first sequence of audio frames, and then inputting the acoustic feature of each audio frame to a noise-added VAD model in chronological order to obtain a probability value of each audio frame in the first sequence of audio frames; and then determining, by an electronic device, a start and an end of the voice signal according to the probability value of each audio frame. During the VAD detection, the start and the end of a voice signal in an audio are recognized with a noise-added VAD model to realize the purpose of accurately recognizing the start and the end of the voice signal.

9 Claims, 4 Drawing Sheets

(58) Field of Classification Search
CPC . G10L 2025/283; G10L 15/063; G10L 15/05; G10L 15/14; G10L 15/142; G10L 2015/027; G10L 25/78; G10L 25/84; G10L 15/08; G10L 15/20; G10L 15/24; G10L 15/26; G10L 19/24; G10L 25/27; G10L 25/63
USPC ....... 704/251, 207, 226, 228, 231, 233, 246, 704/257, 270, 270.1; 381/94.2, 94.3, 94.1
See application file for complete search history.

(56) References Cited

U.S. PATENT DOCUMENTS

| | | | | |
|---|---|---|---|---|
| 6,122,384 | A * | 9/2000 | Mauro | G10L 21/0232 381/94.3 |
| 6,230,123 | B1 * | 5/2001 | Mekuria | H03G 3/32 704/226 |
| 7,970,615 | B2 * | 6/2011 | Attwater | G10L 15/08 704/257 |
| 9,953,632 | B2 * | 4/2018 | Yun | G10L 15/07 |
| 10,223,066 | B2 * | 3/2019 | Martel | G06F 3/167 |
| 10,714,122 | B2 * | 7/2020 | Muchlinski | G10L 15/22 |
| 2013/0108244 | A1 * | 5/2013 | Konuma | G10L 25/87 386/285 |
| 2015/0302847 | A1 * | 10/2015 | Yun | G10L 15/02 704/251 |
| 2019/0043529 | A1 * | 2/2019 | Muchlinski | G10L 25/87 |
| 2019/0074028 | A1 * | 3/2019 | Howard | G06N 3/0427 |

FOREIGN PATENT DOCUMENTS

| | | |
|---|---|---|
| CN | 106448661 A | 2/2017 |
| CN | 108877778 A | 11/2018 |
| WO | 2016007528 A1 | 1/2016 |

* cited by examiner

METHOD AND APPARATUS FOR VOICE ACTIVITY DETECTION

CROSS-REFERENCE TO RELATED APPLICATIONS

This application claims priority to Chinese Patent Application No. 201811482222.6, filed on Dec. 5, 2018, which is hereby incorporated by reference in its entirety.

TECHNICAL FIELD

Embodiments of the present disclosure relate to the field of voice recognition technologies and, in particular, to a method and an apparatus for voice activity detection.

BACKGROUND

A voice activity detection (VAD) technology refers to determination of a voice signal from an audio file including a voice, which plays an important role in voice coding, voice recognition, voice enhancement and other aspects.

An important task of the VAD technology is to determine a start and an end of a voice signal. The purpose of determining the start is to allow a voice recognition system to only focus on a voice segment in the audio file, but not to process a pure noise; and the purpose of determining the end is to allow the voice recognition system to quickly respond to voice interaction to avoid waiting by a user. The conventional VAD method is a method based on signal processing or a method using a deep learning model.

The conventional VAD method cannot accurately recognize the start or the end of the voice signal. For example, it is prone to false or missed determination of the start, or it is prone to false or missed determination of the end.

SUMMARY

The present disclosure provides a method and an apparatus for voice activity detection to realize the purpose of accurately recognizing a start and an end of a voice signal.

In a first aspect, an embodiment of the present disclosure provides a method for voice activity detection, including:
dividing a first audio file into frames to obtain a first sequence of audio frames, where the first audio file includes a continuous voice signal;
extracting an acoustic feature of each audio frame in the first sequence of audio frames;
sequentially inputting the acoustic feature of each audio frame in the first sequence of audio frames to a voice activity detection VAD model to obtain a probability value of each audio frame in the first sequence of audio frames, where the probability value is used to indicate that the audio frame is a voice frame or a noise frame; and
determining a start and an end of the voice signal according to the probability value of each audio frame in the first sequence of audio frames.

In a possible design, before the sequentially inputting the acoustic feature of each audio frame in the first sequence of audio frames to a voice activity detection VAD model, the method further includes:
obtaining a second audio file which is a noise audio file;
cutting the second audio file into at least one noise segment to obtain a set of noise segments; and
training the VAD model according to the set of noise segments.

In a possible design, the training the VAD model according to the set of noise segments includes:
assigning a random number to each noise segment;
adding a noise segment having a random number greater than a preset value to a set of training data; and
training the VAD model according to the set of training data.

In a possible design, before the sequentially inputting the acoustic feature of each audio frame in the first sequence of audio frames to a voice activity detection VAD model, the method further includes:
obtaining a third audio file which is a voice audio file;
cutting the third audio file into at least one voice segment to obtain a set of voice segments; and
the training the VAD model according to the set of noise segments including:
assigning a random number to each noise segment;
randomly assigning a signal noise ratio to each noise segment having a random number less than or equal to a preset value;
performing, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value;
adding the noise-added segment for each noise segment of the noise segments having random numbers less than or equal to the preset value to a set of training data; and
training the VAD model according to the set of training data.

In a possible design, the performing, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value includes:
determining, for each noise segment of the noise segments having random numbers less than or equal to the preset value, a gain of the noise segment according to the signal noise ratio of the noise segment; and
determining the noise-added segment according to the noise segment, the gain, and the voice segment;
X=s+a×n, where X is the noise-added segment, s is the voice segment, a is the gain, and n is the noise segment.

In a possible design, the training the VAD model according to the set of training data includes:
dividing each piece of training data in the set of training data into frames to obtain a second sequence of audio frames;
extracting acoustic features of respective audio frames in the second sequence of audio frames;
labeling each audio frame in the second sequence of audio frames to obtain labeling information of each audio frame in the second sequence of audio frames, where the labeling information is used to indicate that the audio frame in the second sequence of audio frames is a voice frame or a noise frame;
obtaining a feature vector according to the acoustic feature and the labeling information of each audio frame in the second sequence of audio frames; and
learning the feature vector by a deep neural network to obtain the VAD model.

In a possible design, the determining a start and an end of the voice signal according to the probability value of each audio frame in the first sequence of audio frames includes:

determining whether a probability value of a first audio frame exceeds a first threshold, where the first audio frame is included in the first sequence of audio frames;

if the probability value of the first audio frame exceeds the first threshold, determining the first audio frame as the start of the voice signal;

determining whether a probability value of a second audio frame exceeds a second threshold, where the second audio frame is included in the first sequence of audio frames and the second audio frame is after the first audio frame; and if a probability value of the second audio frame exceeds the second threshold and the second audio frame is a first audio frame whose probability value exceeds the second threshold after the first audio frame, determining the second audio frame as the end of the voice signal, where the first threshold is greater than the second threshold.

In a second aspect, an embodiment of the present disclosure provides an apparatus for voice activity detection, including:

a processing module, configured to divide a first audio file into frames to obtain a first sequence of audio frames, where the first audio file includes a continuous voice signal;

an extracting module, configured to extract an acoustic feature of each audio frame in the first sequence of audio frames;

an obtaining module, configured to sequentially input the acoustic feature of each audio frame in the first sequence of audio frames to a voice activity detection VAD model to obtain a probability value of each audio frame in the first sequence of audio frames, where the probability value is used to indicate that the audio frame is a voice frame or a noise frame; and a determining module, configured to determine a start and an end of the voice signal according to the probability value of each audio frame in the first sequence of audio frames.

In a possible design, the apparatus described above further includes:

a training module, configured to: before the obtaining module sequentially inputs the acoustic feature of each audio frame in the first sequence of audio frames to the voice activity detection VAD model, obtain a second audio file which is a noise audio file; cut the second audio file into at least one noise segment to obtain a set of noise segments; and train the VAD model according to the set of noise segments.

In a possible design, when training the VAD model according to the set of noise segments, the training module is configured to: assign a random number to each noise segment; add a noise segment having a random number greater than a preset value to a set of training data; and train the VAD model according to the set of training data.

In a possible design, the training module is configured to: before the obtaining module sequentially inputs the acoustic feature of each audio frame in the first sequence of audio frames to the voice activity detection VAD model, obtain a third audio file which is a voice audio file; cut the third audio file into at least one voice segment to obtain a set of voice segments; assign a random number to each noise segment; randomly assign a signal noise ratio to each noise segment having a random number less than or equal to a preset value; perform, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value; add the noise-added segment for each noise segment of the noise segments having random numbers less than or equal to the preset value to a set of training data; and train the VAD model according to the set of training data.

In a possible design, when performing, for each noise segment of the noise segments having random numbers less than or equal to the preset value, the noise addition on the voice segment according to the noise segment and the signal noise ratio of the noise segment to obtain the noise-added segment for each noise segment of the noise segments having random numbers less than or equal to the preset value, the training module is specifically configured to: determine, for each noise segment of the noise segments having random numbers less than or equal to the preset value, a gain of the noise segment according to the signal noise ratio of the noise segment; and determine the noise-added segment according to the noise segment, the gain, and the voice segment; $X=s+a \times n$, where X is the noise-added segment, s is the voice segment, a is the gain, and n is the noise segment.

In a possible design, when training the VAD model according to the set of training data, the training module is specifically configured to: divide each piece of training data in the set of training data into frames to obtain a second sequence of audio frames; extract an acoustic feature of each audio frame in the second sequence of audio frames; label each audio frame in the second sequence of audio frames to obtain labeling information of each audio frame in the second sequence of audio frames, where the labeling information is used to indicate that the audio frame in the second sequence of audio frames is a voice frame or a noise frame; obtain a feature vector according to the acoustic feature and the labeling information of each audio frame in the second sequence of audio frames; and learn the feature vector by a deep neural network to obtain the VAD model.

In a possible design, the determining module is specifically configured to: determine whether a probability value of a first audio frame exceeds a first threshold, where the first audio frame is included in the first sequence of audio frames; if the probability value of the first audio frame exceeds the first threshold, determine the first audio frame as the start of the voice signal; determine whether a probability value of a second audio frame exceeds a second threshold, where the second audio frame is included in the first sequence of audio frames and the second audio frame is after the first audio frame; and if a probability value of the second audio frame exceeds the second threshold and the second audio frame is a first audio frame whose probability value exceeds the second threshold after the first audio frame, determine the second audio frame as the end of the voice signal, where the first threshold is greater than the second threshold.

In a third aspect, an embodiment of the present disclosure provides an apparatus for voice activity detection, including: a processor, a memory, and a computer program stored on the memory and executable on the processor, where the processor implements the method described above according to the first aspect or various possible implementations thereof when executing the program.

In a fourth aspect, an embodiment of the present disclosure provides a storage medium, where the storage medium has instructions stored therein which, when running on a computer, cause the computer to perform the method described above according to the first aspect or various possible implementations thereof.

In a fifth aspect, an embodiment of the present disclosure provides a computer program product which, when running on a computer, causes the computer to perform the method described above according to the first aspect or various possible implementations thereof.

The method and the apparatus for voice activity detection provided in embodiments of the present disclosure allow for dividing a to-be-detected audio file (that is, a first audio file including a voice signal) into frames to obtain a first sequence of audio frames, extracting an acoustic feature of each audio frame in the first sequence of audio frames, and then inputting the acoustic feature of each audio frame to a noise-added VAD model in chronological order to obtain a probability value of each audio frame in the first sequence of audio frames, where the probability value of each audio frame is used to indicate that the corresponding audio frame is a voice frame or a noise frame; and then determining, by an electronic device, a start and an end of the voice signal according to the probability value of each audio frame. During the VAD detection, the start and the end of a voice signal in an audio are recognized with a noise-added VAD model to realize the purpose of accurately recognizing the start and the end of the voice signal.

BRIEF DESCRIPTION OF DRAWINGS

In order to illustrate technical solutions in embodiments of the present disclosure or the prior art more clearly, accompanying drawings used for description of the embodiments or the prior art will be briefly described hereunder. Obviously, the described drawings merely illustrate some embodiments of present disclosure. For persons of ordinary skill in the art, other drawings may be obtained based on these drawings without any creative effort.

DESCRIPTION OF EMBODIMENTS

In order to make objectives, technical solutions, and advantages of the embodiments of the present disclosure more clear, the technical solutions in the embodiments of the present disclosure will be described hereunder clearly and comprehensively with reference to the accompanying drawings in the embodiments of the present disclosure. Obviously, the described embodiments are only some embodiments of the present disclosure, rather than all embodiments of the present disclosure. All other embodiments obtained by persons of ordinary skill in the art based on the embodiments of the present disclosure without any creative effort shall fall into the scope of the present disclosure.

In a scenario such as voice recognition and voice interaction, a voice system is provided on an electronic device, where the voice system is used for voice recognition, voice interaction, etc., and the system includes a VAD model whose one of important tasks is to determine a start and an end of a voice signal in an audio. The necessity to determine the start of the voice signal is to extract the voice signal from an audio. For example, the electronic device is specifically an intelligent speaker which is always in a standby state and constantly monitors a signal in the current environment to obtain an audio; if the voice system performs voice recognition on each frame of audio that is monitored in real time, power consumption of the intelligent speaker is increased. Therefore, by the VAD model, the start of a voice signal is determined so that the voice system only focuses on a user speaking segment in the audio, but not process a pure noise.

The necessity to determine the end of the voice signal lies in that the voice system can respond quickly after the user makes a sound to express his request; if the voice system responds slowly, the user will complain that "the system responds too slow". For example, if the user says "Today's Weather in Beijing" to an electronic device with a voice interaction function, the user hopes that the voice system can promptly tell him "Beijing is cloudy today . . . " after he finishes speaking.

Ideally, the VAD model can accurately recognize the start and the end of the voice signal in the audio. The VAD model itself is a classification model, and if the model is not ideal, a bad case will occur. There are two kinds of bad cases for start detection: the first is false determination of the start, where a noise segment in the audio is classified into a voice, the VAD model transmits the noise to a voice recognizer, and the power consumption of the electronic device increases. In addition, when the voice recognizer is provided in the cloud instead of being locally provided in the electronic device, there will be more traffic demands; the second is missed determination of the start, where the VAD model fails to detect the start, so no sound is transmitted to the voice recognizer. For example, when the user speaks in a low voice, if the VAD model cannot handle a soft voice, the user's soft voice will be treated as a background noise, and the voice recognizer will not receive any voice.

There are also two kinds of bad cases for end detection: the first is false determination of the end, that is, early termination of the voice signal. In this kind of bad case, when the user has not finished speaking, voice activity detection is ended; when the user speaks, the voice gets lower and lower, and then such kind of bad case will be caused. In addition, a long pause during the user's speaking can also lead to such kind of bad case. For example, the user says "today's weather in Beijing", and the user then takes a breath to continue saying "is suitable for mountain climbing?" If the end detection is too sensitive, the VAD model will take this sentence as two sentences. The second is missed determination, that is, the voice signal is ended, but the voice system does not make any discovery. For example, when the environment is noisy, although the voice ends, the background noise is particularly loud. Therefore, if the VAD model is not accurate enough, the VAD model cannot recognize the end after the voice ends, that is, it cannot recognize that the voice has finished, and thus the user is waiting for feedback from the voice system after his utterance of "Today's Weather in Beijing?", however, since the voice system fails to recognize the end, it will conceive that the user's utterance has not finished, and continues waiting for the user to finish speaking.

The conventional VAD method is a method based on signal processing or a method using a deep learning model. Neither one of the methods can correctly recognize the start and the end of a voice signal in an audio.

In view of this, embodiments of the present disclosure provide a method and an apparatus for voice activity detection, where the start and the end of the voice signal in an audio is recognized with a noise-added VAD model to realize the purpose of accurately recognizing the start and the end of the voice signal.

The method for voice activity detection provided in the embodiment of the present disclosure can be applied to any scenario where voice activity detection is required. The apparatus for voice activity detection that performs the method for voice activity detection can be provided on an electronic device at a client side, or can be provided on a server. The electronic device may be, for example, a computer device, a mobile terminal device, an intelligent speaker, an intelligent TV, an intelligent refrigerator, and other artificial intelligence devices. Hereinafter, the method for voice activity detection according to the embodiment of the present disclosure will be described in detail. Exemplarily, reference may be made to FIG. 1.

Figure 1:
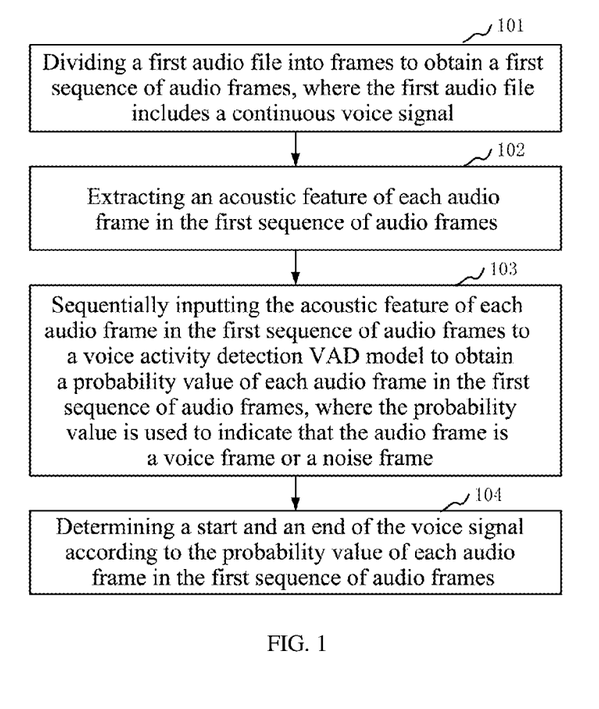
FIG. 1 is a flowchart of a method for voice activity detection according to an embodiment of the present disclosure.

FIG. 1 is a flowchart of a method for voice activity detection according to an embodiment of the present disclosure. The executive subject of this embodiment is an apparatus for voice activity detection, and the apparatus may be implemented by software, hardware or a combination thereof. The apparatus may be a part or an entirety of the electronic device, or may be a part or an entirety of the server. Illustrations are made by taking an example in this embodiment where the method for voice activity detection is applied to the electronic device. This embodiment includes:

101: dividing a first audio file into frames to obtain a first sequence of audio frames, where the first audio file includes a continuous voice signal.

In the embodiment of the present disclosure, the first audio file is an audio file to be performed with voice activity detection, and the first audio file is, for example, an audio file obtained by the electronic device from detecting the current environment in real time.

In this step, the electronic device performs frame division processing on the first audio file, and divides the first audio file into a number of frames. For example, the first audio file is an audio file of 2 minutes; the electronic device divides the first audio file of 2 minutes into 4800 audio frames with a frame length of 25 ms by a unit of 25 milliseconds (ms), and arranges these audio frames in chronological order to obtain the first sequence of audio frames.

102: extracting an acoustic feature of each audio frames in the first sequence of audio frames.

In this step, the electronic device extracts an acoustic feature of each audio frame in the first sequence of audio frames, where the acoustic feature includes an MEL frequency cepstrum coefficient (MFCC) feature, a perceptual linear predictive coefficient (PLP) feature, a frame length, a frame shift, a filterbank 64-dimensional feature, etc.

103: sequentially inputting the acoustic feature of each audio frame in the first sequence of audio frames to a voice activity detection VAD model to obtain a probability value of each audio frame in the first sequence of audio frames, where the probability value is used to indicate that the audio frame is a voice frame or a noise frame.

In the embodiment of the present disclosure, the noise-added VAD model is pre-trained using deep machine learning or the like. In this step, the acoustic feature of each audio frame in the first sequence of audio frames are input to a VAD model in chronological order to obtain a probability value of each audio frame. For a particular audio frame, a probability value obtained from the audio frame is used to indicate that the audio frame is a voice frame or a noise frame.

104: determining a start and an end of the voice signal according to the probability value of each audio frame in the first sequence of audio frames.

In this step, the electronic device determines, according to the probability value of each audio frame in the first sequence of audio frames, the start and the end of the voice signal included in the first audio file. For example, the first sequence of audio frames includes 10,000 audio frames, where the 300th audio frame is the start of the voice signal, and the 7,000th audio frame is the end of the voice signal.

The method for voice activity detection provided in embodiments of the present disclosure allows for dividing a to-be-detected audio file (that is, a first audio file including voice signals) into frames to obtain a first sequence of audio frames, extracting an acoustic feature of each audio frame in the first sequence of audio frames, and then inputting the acoustic feature of each audio frame to a noise-added VAD model in chronological order to obtain a probability value of each audio frame in the first sequence of audio frames, where the probability value of each audio frame is used to indicate that the corresponding audio frame is a voice frame or a noise frame; and then determining, by an electronic device, a start and an end of the voice signals according to the probability value of each audio frame. During the VAD detection, the start and the end of voice signal in an audio is recognized with a noise-added VAD model to realize the purpose of accurately recognizing the start and the end of the voice signal.

Hereinafter, detailed description will be given on how to determine the start and the end of the voice signal according to the probability value of each audio frame in the first sequence of audio frames in the above embodiment.

In a possible implementation, when determining the start and the end of the voice signal according to the probability value of each audio frame in the first sequence of audio frames, the electronic device determines whether a probability value of a first audio frame exceeds a first threshold, where the first audio frame is included in the first sequence of audio frames; if the probability value of the first audio frame exceeds the first threshold, the electronic device determines the first audio frame as the start of the voice signal; the electronic device determines whether a probability value of a second audio frame exceeds a second threshold, where the second audio frame is included in the first sequence of audio frames and the second audio frame is after the first audio frame; and if a probability value of the second audio frame exceeds the second threshold and the second audio frame is a first audio frame whose probability value exceeds the second threshold after the first audio frame, the electronic device determines the second audio frame as the end of the voice signal, where the first threshold is greater than the second threshold.

Exemplarily, in the embodiment of the present disclosure, different thresholds are respectively provided for the start and the end. For example, the threshold of the start is the first threshold, for example, 0.6, and the threshold of the end is the second threshold, for example, 0.4, thereby reducing the possibility of falsely reporting a noise as a voice.

In the above embodiment, before sequentially inputting the acoustic feature of each audio frame in the first sequence of audio frames to the voice activity detection VAD model, the electronic device needs to acquire a noise-added VAD model. Hereinafter, detailed description will be given on how the electronic device uses the training to obtain the noise-added VAD model. Illustratively, obtaining the noise-added VAD model through training includes three stages:

First Stage: Data Preparation.

In this stage, the electronic device obtains a second audio file which is a noise audio file, cuts the second audio file into at least one noise segment to obtain a set of noise segments, and trains the VAD model according to the set of noise segments.

Exemplarily, the second audio file is a noise audio file required by the electronic device to train the VAD model, and a third audio file is a voice audio file required by the electronic device to train the VAD model. Before the VAD model is trained, for a target application scenario such as a home application scenario, a sound pickup device is used to collect a noise audio for several hours to obtain the second audio file; and the sound pickup device is used to collect a voice audio for several hours to obtain the third audio file. Then, the second audio file is switched to a noise segment of target duration, for example, the second audio file having a duration of several hours is cut into a plurality of one-minute noise segments which are respectively indexed to obtain an index table for the noise segments, and the table is, for example, list_n. The one-minute noise segments are separately numbered and stored in the set of noise segments, and the number of each noise segment is, for example, an index of the noise segment.

Hereinafter, detailed description will be given on how the electronic device obtains training data according to a noise segment in the set of noise segments.

In a possible implementation, when training the VAD model according to the set of noise segments, the electronic device assigns a random number to each noise segment, adds a noise segment having a random number greater than a preset value to a set of training data, and trains the VAD model according to the set of training data.

Exemplarily, a random number is preset, which is termed as a preset value P_S. The preset value indicates a probability of occurrence of a voice signal in the second audio file, 0≤P_S≤1. That is to say, voice may occur in the second audio file, that is, there may be only noise. In addition, a signal noise ratio (SNR) range is preset, and a distribution function P of the SNR is set, that is to say, among the set of noise segments obtained from the second audio file, an SNR of each noise segment is random within the preset SNR range, that is, the SNR of each noise segment is within the preset SNR range and the SNR of each noise segment is subject to the preset distribution function P. During preparation of the training data, the electronic device assigns a random number for each noise segment; adds a noise segment having a random number greater than a preset value to a set of training data; and trains the VAD model according to the set of training data.

For a noise segment having a random number less than or equal to the preset value, the electronic device obtains a third audio file which is a voice audio file, and cuts the third audio file into at least one voice segment to obtain a set of voice segments. For example, the third audio file is switched to a voice segment of target duration, for example, the third audio file having a duration of several hours is cut into a plurality of one-minute voice segments which are respectively indexed to obtain an index table for the voice segments, and the table is, for example, list_s. The one-minute voice segments are separately numbered and stored in the set of voice segments, and the number of each voice segment is, for example, an index of the voice segment. Then, the electronic device performs, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value, adds the noise-added segment for each noise segment of the noise segments having random numbers less than or equal to the preset value to the set of training data, and trains the VAD model according to the set of training data.

Hereinafter, an example will be given on how the electronic device obtains the training data according to the noise segment in the set of noise segments and the voice segment in the set of voice segments. Exemplarily, reference may be made to FIG. 2.

Figure 2:
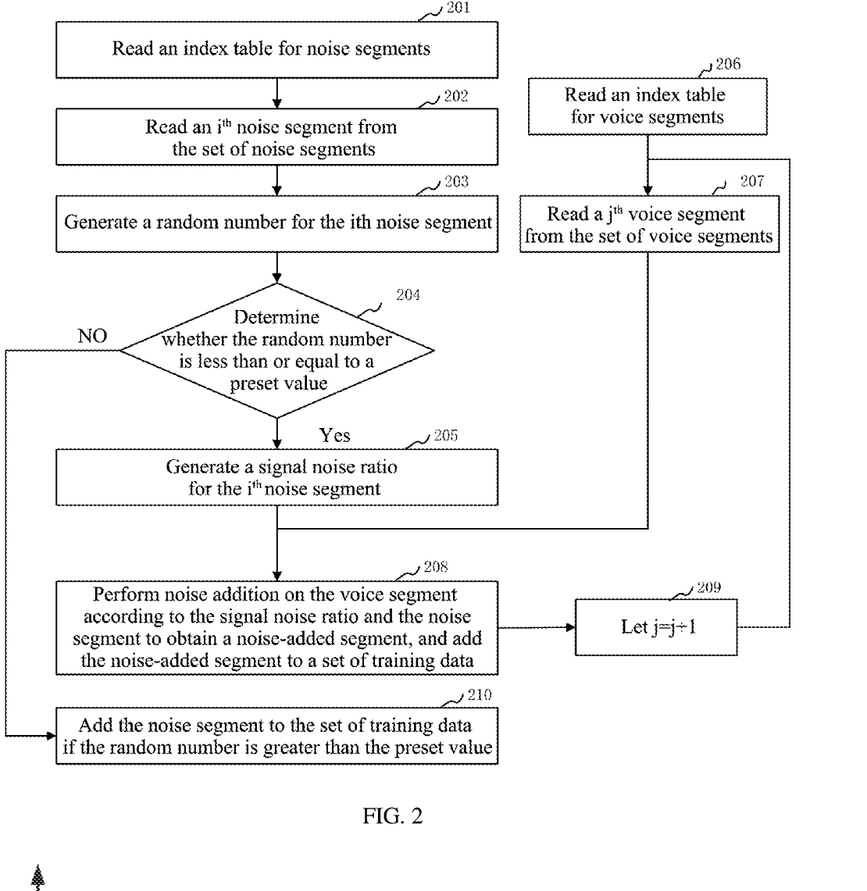
FIG. 2 is a flowchart of generating training data in a method for voice activity detection according to an embodiment of the present disclosure.

FIG. 2 is a flowchart of generating training data in a method for voice activity detection according to an embodiment of the present disclosure. Referring to FIG. 2, the embodiment includes:

201: read the index table for the noise segments.

202: read an $i^{th}$ noise segment from the set of noise segments

In this step, the $i^{th}$ noise segment is the noise segment described above, which is any unused noise segment from the set of noise segments.

203: generate a random number for the $i^{th}$ noise segment.

204: determine whether the random number is less than or equal to a preset value; if the random number is less than or equal to the preset value, proceed with 205; if the random number is greater than the preset value, proceed with 210.

205: generate a signal noise ratio for the $i^{th}$ noise segment.

The signal noise ratio is any signal noise ratio within a preset signal noise ratio range, and the signal noise ratio is subject to a preset distribution function P.

206: read an index table for the voice segments.

207: read a $j^{th}$ voice segment from the set of voice segments.

In this step, the $j^{th}$ voice segment is the voice segment described above, which is any unused voice segment from the set of voice segments.

208: perform noise addition on the voice segment according to the signal noise ratio and the noise segment to obtain a noise-added segment, and add the noise-added segment to a set of training data.

Illustratively, when performing the noise addition on the voice segment, the electronic device first determines a gain of the noise segment; and then determines the noise-added segment according to the noise segment, the gain, and the voice segment; X=s+a×n, where X is the noise-added segment, s is the voice segment, α is the gain, and n is the noise segment.

When the noise addition is performed on the voice segment as described above, a gain satisfying the current SNR (i.e. a first SNR), may be determined according to a calculation formula of the signal ratio, the gain is also referred to as a gain of the noise segment, and the gain may also be referred to as a coefficient of mixing the voice with the noise. According to the signal ratio formula, the gain $$\alpha = \frac{\sigma_s}{\sigma_n \sqrt{10^{snr/10}}}.$$

In the above signal ratio formula, $\sigma_n$ is a standard deviation derived from the noise segment in the set of noise segments, and $\sigma_s$ is a standard deviation derived from the voice segment in the set of voice segments.

It should be noted that, during calculation of the gain as described above, when a noise segment has a random number less than or equal to the preset value, the electronic device will generate a signal noise ratio for the noise segment, and different noise segments have different signal noise ratios, therefore, different noise segments have different gains. That is to say, in the above signal ratio formula, the SNR in the formula varies for different noise segments.

209: let j=j+1.

After the electronic device reads the $j^{th}$ voice segment, or the $j^{th}$ voice segment is used for noise addition, the electronic device needs to read and write a new voice segment, that is, the $j+1^{th}$ voice segment, upon another determination of a noise segment having a random number less than the preset value from the set of noise segments.

210: add the noise segment to the set of training data if the random number is greater than the preset value.

According to the above description, training data in the set of training data includes a noise segment whose random number is greater than or equal to a preset value and which is not noise-added and a voice segment which is noise-added.

Second Stage: Organization of Training Data.

In a possible implementation, when training the VAD model according to the set of training data, the electronic device divides each piece of training data in the set of training data into frames to obtain a second sequence of audio frames, extracts an acoustic feature of each audio frame in the second sequence of audio frames, labels each audio frame in the second sequence of audio frames to obtain labeling information of each audio frame in the second sequence of audio frames, where the labeling information is used to indicate that the audio frame in the second sequence of audio frames is a voice frame or a noise frame, obtains a feature vector according to the acoustic feature and the labeling information of each audio frame in the second sequence of audio frames; and learns the feature vector by a deep neural network to obtain the VAD model.

Exemplarily, according to Step 210 of the first stage described above, training data in the set of training data includes a noise segment whose random number is greater than or equal to the preset value and which is not noise-added, and/or a voice segment which is noise-added, that is to say, duration of each piece of training data in the set of training data is the same as duration of the noise segment or of the voice segment, for example, one minute. During organization of the training data, each piece of training data is divided into frames first, for example, each piece of training data is first divided into sub-data having a length of several seconds, for example, the training data has a duration of one minute, and the one-minute training data is divided into 10 pieces of sub-data having a length of 6 seconds, and then each piece of sub-data is divided into frames to obtain a second sequence of audio frames.

Then, an acoustic feature of each audio frame in the second sequence of audio frames is extracted, and each audio frame in the second sequence of audio frames is labeled to obtain a label of each audio frame. As such, each audio frame in the second sequence of audio frames may be represented by $\{x, y\}$, where x indicates the acoustic feature of the audio frame and y indicates that the audio frame is a voice frame or a noise frame. In an actual implementation, each audio frame in the second sequence of audio frames may be labeled in a manual labeling manner; alternatively, each audio frame in the second sequence of audio frames may be labeled with a method such as forced alignment by machine in the voice recognition. Exemplarily, when an audio frame is labeled as 0, it indicates that the audio frame is a noise frame; when the audio frame is labeled as 1, it indicates that the audio frame is a voice frame. In addition, if all audio frames in the set of training data are labeled as 0, it indicates that there are only noise frames in the set of training data. Finally, the feature vector is obtained according to the acoustic feature and the labeling information of each audio frame in the second sequence of audio frames.

Figure 3:
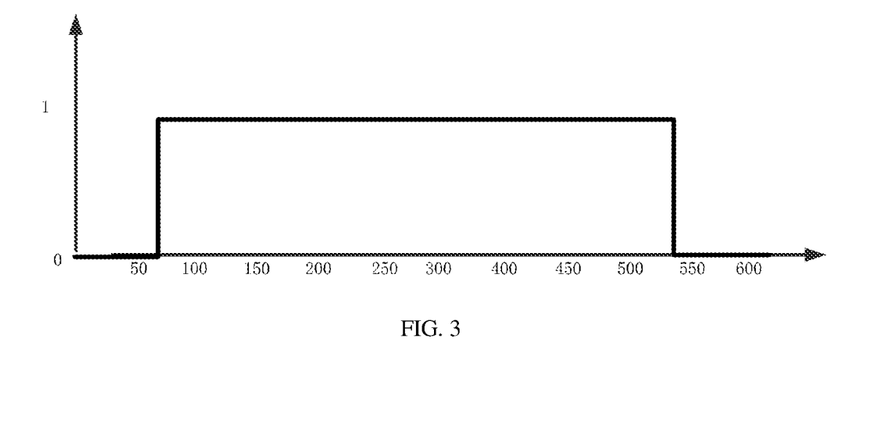
FIG. 3 is a schematic diagram showing labeling information in a method for voice activity detection according to an embodiment of the present disclosure.

FIG. 3 is a schematic diagram showing labeling information in a method for voice activity detection according to an embodiment of the present disclosure. Referring to FIG. 3, where the abscissa indicates time, the ordinate indicates the labeling information, and the black bold line indicates the tendency that the labeling information changes over time.

Third Stage: A Stage of Training the VAD Model.

In the embodiment of the present disclosure, the feature vector obtained above in the second stage is learned with a deep neural network to obtain the VAD model. The deep neural network is a recurrent neural network (RNN) such as a Gated Recurrent Unit (GRU) network, a Long Short Term Memory (LSTM) network, or the like. Among them, the use of the GRU network to train the VAD model is faster. The deep neural network is stacked by multiple layers of RNN, the final output layer includes 2 nodes, Softmax is used for activation, cross entropy is used as a cost function, and each frame has a classification result.

Fourth Stage: A Test Stage.

In this stage, after a test audio file is divided into frames, the acoustic feature is extracted for each frame, and then acoustic features are input into the VAD model frame by frame to obtain an output h for each frame, and the h represents a probability value, which is compared with a threshold to determine whether the frame is a voice frame or a noise frame. After the voice frame or the noise frame is determined according to the output h, the voice frame or the noise frame is compared with that obtained through manual labeling or through a machine alignment method to determine the accuracy of the trained VAD model.

The following describes apparatus embodiments of the present disclosure, which can be used to implement the method embodiments of the present disclosure. For details not disclosed in the apparatus embodiments of the present disclosure, reference may be made to the method embodiments of the present disclosure.

Figure 4:
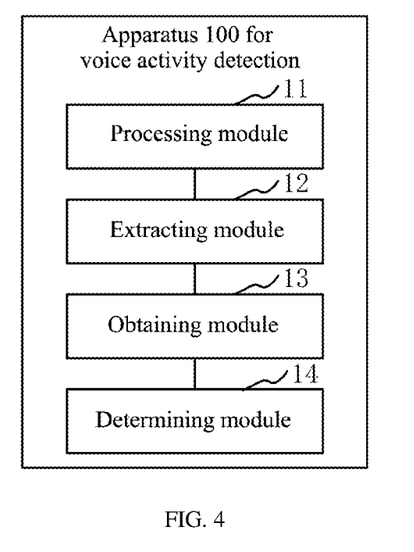
FIG. 4 is a schematic structural diagram of an apparatus for voice activity detection according to an embodiment of the present disclosure.

FIG. 4 is a schematic structural diagram of an apparatus for voice activity detection according to an embodiment of the present disclosure. The apparatus for voice activity detection may be implemented by software and/or hardware. As shown in FIG. 4, the apparatus 100 for voice activity detection includes:

a processing module 11, configured to divide a first audio file into frames to obtain a first sequence of audio frames, where the first audio file includes a continuous voice signal;

an extracting module 12, configured to extract an acoustic feature of each audio frame in the first sequence of audio frames;

an obtaining module 13, configured to sequentially input the acoustic feature of each audio frame in the first sequence of audio frames to a voice activity detection VAD model to obtain a probability value of each audio frame in the first sequence of audio frames, where the probability value is used to indicate that the audio frame is a voice frame or a noise frame; and a determining module 14, configured to determine a start and an end of the voice signal according to the probability value of each audio frame in the first sequence of audio frames.

Figure 5:
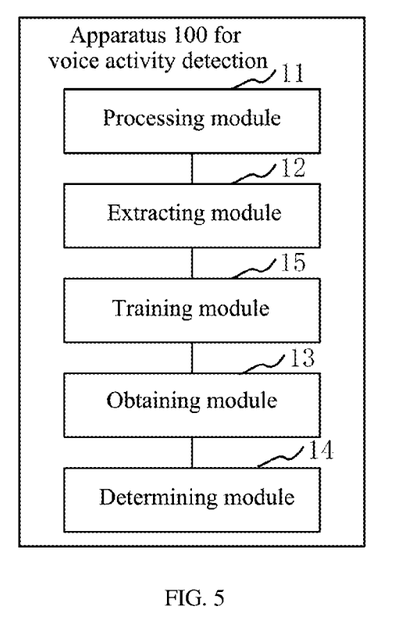
FIG. 5 is a schematic structural diagram of another apparatus for voice activity detection according to an embodiment of the present disclosure.

FIG. 5 is a schematic structural diagram of another apparatus for voice activity detection according to an embodiment of the present disclosure. The apparatus for voice activity detection based on FIG. 4 as described above further includes:

a training module 15, configured to: before the obtaining module 13 sequentially inputs the acoustic feature of each audio frame in the first sequence of audio frames to the voice activity detection VAD model, obtain a second audio file which is a noise audio file; cut the second audio file into at least one noise segment to obtain a set of noise segments; and train the VAD model according to the set of noise segments.

In a possible design, when training the VAD model according to the set of noise segments, the training module 15 is specifically configured to: assign a random number to each noise segment; add a noise segment having a random number greater than a preset value to a set of training data; and train the VAD model according to the set of training data.

In a possible design, the training module 15 is further configured to: before the obtaining module 13 sequentially inputs the acoustic feature of each audio frame in the first sequence of audio frames to the voice activity detection VAD model, obtain a third audio file which is a voice audio file; cut the third audio file into at least one voice segment to obtain a set of voice segments; and when training the VAD model according to the set of noise segments, the training module 15 is configured to: assign a random number to each noise segment; randomly assign a signal noise ratio to each noise segment having a random number less than or equal to a preset value; perform, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value; add the noise-added segment for each noise segment of the noise segments having random numbers less than or equal to the preset value to the set of training data; and train the VAD model according to the set of training data.

In a possible design, when performing, for each noise segment of the noise segments having random numbers less than or equal to the preset value, the noise addition on the voice segment according to the noise segment and the signal noise ratio of the noise segment to obtain the noise-added segment for each noise segment of the noise segments having random numbers less than or equal to the preset value, the training module 15 is specifically configured to: determine, for each noise segment of the noise segments having random numbers less than or equal to the preset value, a gain of the noise segment according to the signal noise ratio of the noise segment; and determine the noise-added segment according to the noise segment, the gain, and the voice segment; X=s+a×n, where X is the noise-added segment, s is the voice segment, a is the gain, and n is the noise segment.

In a possible design, when training the VAD model according to the set of training data, the training module 15 is specifically configured to: divide each piece of training data in the set of training data into frames to obtain a second sequence of audio frames; extract an acoustic feature of each audio frame in the second sequence of audio frames; label each audio frame in the second sequence of audio frames to obtain labeling information of each audio frame in the second sequence of audio frames, where the labeling information is used to indicate that the audio frame in the second sequence of audio frames is a voice frame or a noise frame; obtain a feature vector according to the acoustic feature and the labeling information of each audio frame in the second sequence of audio frames; and learn the feature vector by a deep neural network to obtain the VAD model.

In a possible design, the determining module 14 is specifically configured to: determine whether a probability value of a first audio frame exceeds a first threshold, where the first audio frame is included in the first sequence of audio frames; if the probability value of the first audio frame exceeds the first threshold, determine the first audio frame as the start of the voice signal; determine whether a probability value of a second audio frame exceeds a second threshold, where the second audio frame is included in the first sequence of audio frames and the second audio frame is after the first audio frame; and if a probability value of the second audio frame exceeds the second threshold and the second audio frame is a first audio frame whose probability value exceeds the second threshold after the first audio frame, determine the second audio frame as the end of the voice signal, where the first threshold is greater than the second threshold.

For the apparatus for voice activity detection provided by the embodiment of the present disclosure, reference for implementation principles and technologies can be made to the foregoing method embodiment, and details are not described herein.

Figure 6:
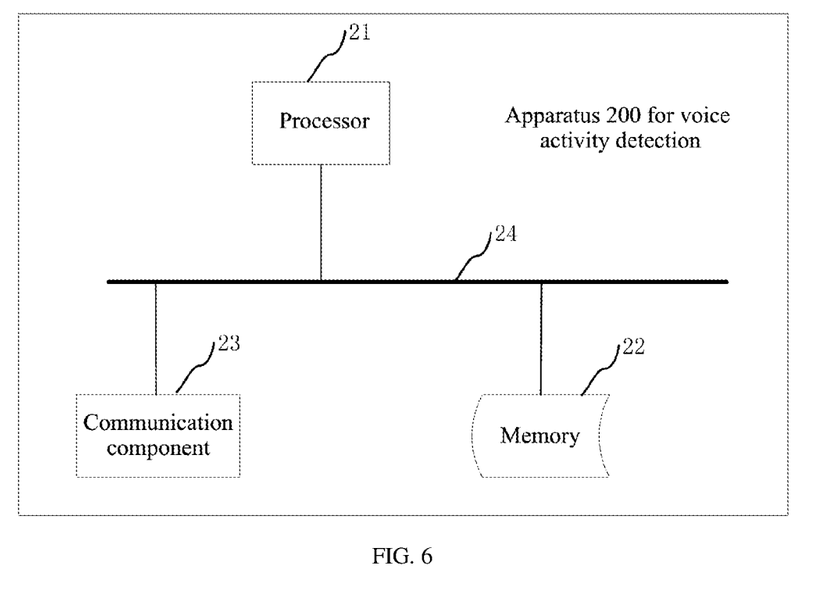
FIG. 6 is a schematic structural diagram of still another apparatus for voice activity detection according to an embodiment of the present disclosure.

FIG. 6 is a schematic structural diagram of still another apparatus for voice activity detection according to an embodiment of the present disclosure. As shown in FIG. 6, the apparatus 200 for voice activity detection includes:

at least one processor 21 and a memory 22;

where the memory 22 is stored with computer executable instructions;

and the at least one processor 21 executes the computer executable instructions stored in the memory 22 such that the at least one processor 21 performs the method for voice activity detection as described above.

For a specific implementation process of the processor 21, reference may be made to the foregoing method embodiments. Implementation principles and technical effects thereof are similar to those of the method embodiments, and details will not be described herein again.

Optionally, the apparatus 200 for voice activity detection further includes a communication component 23. The processor 21, the memory 22, and the communication component 23 may be connected via a bus 24.

An embodiment of the present disclosure further provides a storage medium, where the storage medium has computer executable instructions stored therein which, when executed by a processor, are configured to perform the method for voice activity detection as described above.

An embodiment of the present disclosure further provides a computer program product which, when running on a computer, causes the computer to perform the method for voice activity detection as described above.

In the forgoing embodiments, it will be appreciated that the disclosed devices and methods may be implemented in other manners. For example, the described device embodiments are merely exemplary. For example, the division of the modules is merely a division of logical functions and there may be other divisions during actual implementations.

For example, a plurality of modules may be combined or integrated into another system, or some features may be omitted or not performed. In addition, the shown or discussed mutual couplings or direct couplings or communication connections may be indirect couplings or communication connections through some interfaces, devices or modules and may be implemented in electronic, mechanical, or other forms.

The modules described as separate parts may or may not be physically separate, and the parts shown as modules may or may not be physical units, that is, may be located in one position, or may be distributed on a plurality of network units. Some or all of the modules may be selected according to actual needs to achieve the objectives of the scheme in the embodiments.

In addition, functional modules in the embodiments of the present disclosure may be integrated into one processing unit, or each of the modules may exist alone physically, or two or more modules may be integrated into one unit. The unit integrated by the above modules may be implemented in a form of hardware, or may be implemented in a form of hardware plus a software function unit.

The integrated module implemented in a form of a software function unit as described above may be stored in a computer-readable storage medium. The above software function module is stored in a storage medium, and includes several instructions for enabling an electronic device (which may be a personal computer, a server, or a network device, etc.) or a processor to perform some steps of the method described in the embodiments of the present disclosure.

It will be appreciated that the foregoing processor may be a central processing unit (CPU), or may be other general purpose processor, digital signal processor (DSP), application specific integrated circuit (ASIC), or the like. The general purpose processor may be a microprocessor; alternatively, the processor may be any conventional processor or the like. The steps of the method disclosed in connection with the present disclosure may be directly embodied as being performed and implemented by a hardware processor or by a combination of hardware and software modules in the processor.

The memory may include a high speed RAM memory, which may also include a non-volatile memory NVM such as at least one disk memory, or a USB flash drive, a mobile hard disk, a read only memory, a magnetic disk, an optical disk, or the like.

The bus may be an industry standard architecture (ISA) bus, a peripheral component interconnect (PCI) bus, an extended Industry standard architecture (EISA) bus or the like. The bus may be divided into an address bus, a data bus, a control bus, and the like. For ease of representation, the bus in the drawings of the present disclosure is not limited to only one bus or one type of bus.

The above storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The storage medium may be any available media that can be accessed by a general purpose or special purpose computer.

An exemplary storage medium is coupled to a processor to enable the processor to read information from, and write information to, the storage medium. Certainly, the storage medium may also be an integral part of the processor. The processor and the storage medium may be located in an application specific integrated circuit (ASIC). Certainly, the processor and the storage medium may also reside in a terminal or a server as discrete components.

Persons of ordinary skill in the art may understand that, all or some steps of the foregoing method embodiments may be implemented by program instruction relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A method for voice activity detection, comprising:
dividing a first audio file into frames to obtain a first sequence of audio frames, wherein the first audio file comprises a continuous voice signal;
extracting an acoustic feature of each audio frame in the first sequence of audio frames;
sequentially inputting the acoustic feature of each audio frame in the first sequence of audio frames to a voice activity detection VAD model to obtain a probability value of each audio frame in the first sequence of audio frames, wherein the probability value is used to indicate that the audio frame is a voice frame or a noise frame; and
determining a start and an end of the voice signal according to the probability value of each audio frame in the first sequence of audio frames;
wherein before the sequentially inputting the acoustic feature of each audio frame in the first sequence of audio frames to a voice activity detection VAD model, the method further comprises:
obtaining a second audio file which is a noise audio file;
cutting the second audio file into at least one noise segment to obtain a set of noise segments; and training the VAD model according to the set of noise segments;
wherein before the sequentially inputting the acoustic feature of each audio frame in the first sequence of audio frames to a voice activity detection VAD model, the method further comprises:
obtaining a third audio file which is a voice audio file;
cutting the third audio file into at least one voice segment to obtain a set of voice segments; and
wherein the training the VAD model according to the set of noise segments comprises:
assigning a random number to each noise segment;
randomly assigning a signal noise ratio to each noise segment having a random number less than or equal to a preset value;
performing, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value;

adding the noise-added segment for each noise segment of the noise segments having random numbers less than or equal to the preset value to a set of training data; and training the VAD model according to the set of training data.

2. The method according to claim 1, wherein the training the VAD model according to the set of noise segments comprises:

assigning a random number to each noise segment;

adding a noise segment having a random number greater than a preset value to a set of training data; and training the VAD model according to the set of training data.

3. The method according to claim 2, wherein the training the VAD model according to the set of training data comprises:

dividing each piece of training data in the set of training data into frames to obtain a second sequence of audio frames;

extracting an acoustic feature of each audio frame in the second sequence of audio frames;

labeling each audio frame in the second sequence of audio frames to obtain labeling information of each audio frame in the second sequence of audio frames, wherein the labeling information is used to indicate that the audio frame in the second sequence of audio frames is a voice frame or a noise frame;

obtaining a feature vector according to the acoustic feature and the labeling information of each audio frame in the second sequence of audio frames; and learning the feature vector by a deep neural network to obtain the VAD model.

4. The method according to claim 1, wherein the performing, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value comprises:

determining, for each noise segment of the noise segments having random numbers less than or equal to the preset value, a gain of the noise segment according to the signal noise ratio of the noise segment; and determining the noise-added segment according to the noise segment, the gain, and the voice segment;

$X=s+a \times n$, wherein X is the noise-added segment, s is the voice segment, a is the gain, and n is the noise segment.

5. The method according to claim 1, wherein the training the VAD model according to the set of training data comprises:

dividing each piece of training data in the set of training data into frames to obtain a second sequence of audio frames;

extracting an acoustic feature of each audio frame in the second sequence of audio frames;

labeling each audio frame in the second sequence of audio frames to obtain labeling information of each audio frame in the second sequence of audio frames, wherein the labeling information is used to indicate that the audio frame in the second sequence of audio frames is a voice frame or a noise frame;

obtaining a feature vector according to the acoustic feature and the labeling information of each audio frame in the second sequence of audio frames; and learning the feature vector by a deep neural network to obtain the VAD model.

6. The method according to claim 1, wherein the determining a start and an end of the voice signal according to the probability value of each audio frame in the first sequence of audio frames comprises:

determining whether a probability value of a first audio frame exceeds a first threshold, wherein the first audio frame is comprised in the first sequence of audio frames;

if the probability value of the first audio frame exceeds the first threshold, determining the first audio frame as the start of the voice signal;

determining whether a probability value of a second audio frame exceeds a second threshold, wherein the second audio frame is comprised in the first sequence of audio frames and the second audio frame is after the first audio frame; and if a probability value of the second audio frame exceeds the second threshold and the second audio frame is a first audio frame whose probability value exceeds the second threshold after the first audio frame, determining the second audio frame as the end of the voice signal, wherein the first threshold is greater than the second threshold.

7. An apparatus for voice activity detection, comprising: at least one processor, and a memory for storing computer executable instructions which, when executed by the at least one processor, cause the at least one processor to:

divide a first audio file into frames to obtain a first sequence of audio frames, wherein the first audio file comprises a continuous voice signal;

extract an acoustic feature of each audio frame in the first sequence of audio frames;

sequentially input the acoustic feature of each audio frame in the first sequence of audio frames to a voice activity detection VAD model to obtain a probability value of each audio frame in the first sequence of audio frames, wherein the probability value is used to indicate that the audio frame is a voice frame or a noise frame; and determine a start and an end of the voice signal according to the probability value of each audio frame in the first sequence of audio frames;

before the acoustic feature of each audio frame in the first sequence of audio frames is sequentially input to a voice activity detection VAD model, the at least one processor is further caused to:

obtain a second audio file which is a noise audio file; cut the second audio file into at least one noise segment to obtain a set of noise segments; and train the VAD model according to the set of noise segments;

before the acoustic feature of each audio frame in the first sequence of audio frames is sequentially input to a voice activity detection VAD model, the at least one processor is further caused to:

obtain a third audio file which is a voice audio file; cut the third audio file into at least one voice segment to obtain a set of voice segments; and the at least one processor is caused to:

assign a random number to each noise segment; randomly assign a signal noise ratio to each noise segment having a random number less than or equal to a preset value; perform, for each noise segment of noise segments having random numbers less than or equal to the preset value, noise addition on a voice segment according to the noise segment and the signal noise ratio of the noise segment to obtain a noise-added segment for each noise segment of the noise segments having random numbers less than or equal to the preset value; add the noise-added segment for each noise segment of the noise segments having random numbers less than or equal to the preset value to a set of training data; and train the VAD model according to the set of training data.

8. A non-transitory storage medium, wherein the storage medium has instructions stored therein which, when running on a computer, cause the computer to perform the method according to claim 1.

9. A method for voice activity detection, comprising:
dividing a first audio file into frames to obtain a first sequence of audio frames, wherein the first audio file comprises a continuous voice signal;
extracting an acoustic feature of each audio frame in the first sequence of audio frames;
sequentially inputting the acoustic feature of each audio frame in the first sequence of audio frames to a voice activity detection VAD model to obtain a probability value of each audio frame in the first sequence of audio frames, wherein the probability value is used to indicate that the audio frame is a voice frame or a noise frame; and
determining a start and an end of the voice signal according to the probability value of each audio frame in the first sequence of audio frames;
wherein the determining a start and an end of the voice signal according to the probability value of each audio frame in the first sequence of audio frames comprises:
determining whether a probability value of a first audio frame exceeds a first threshold, wherein the first audio frame is comprised in the first sequence of audio frames;
if the probability value of the first audio frame exceeds the first threshold, determining the first audio frame as the start of the voice signal;
determining whether a probability value of a second audio frame exceeds a second threshold, wherein the second audio frame is comprised in the first sequence of audio frames and the second audio frame is after the first audio frame; and
if a probability value of the second audio frame exceeds the second threshold and the second audio frame is a first audio frame whose probability value exceeds the second threshold after the first audio frame, determining the second audio frame as the end of the voice signal, wherein the first threshold is greater than the second threshold.

* * * * *